(12) United States Patent
Moriguchi

(10) Patent No.: US 6,848,324 B2
(45) Date of Patent: Feb. 1, 2005

(54) METHOD FOR DETERMINING WHETHER OR NOT WHEELS ARE LOCKED

(75) Inventor: Hiroshi Moriguchi, Kobe (JP)

(73) Assignee: Fujitsu Ten Limited, Kobe (JP)

(*) Notice: Subject to any disclaimer, the term of this patent is extended or adjusted under 35 U.S.C. 154(b) by 0 days.

(21) Appl. No.: 10/706,855

(22) Filed: Nov. 12, 2003

(65) Prior Publication Data

US 2004/0187600 A1 Sep. 30, 2004

(30) Foreign Application Priority Data

Nov. 14, 2002 (JP) ........................................ 2002-330589

(51) Int. Cl.$^7$ .............................. G01L 5/24; G01D 9/00
(52) U.S. Cl. .................................. 73/862.27; 73/862.23
(58) Field of Search ........................ 73/862.27, 862.23, 73/146

(56) References Cited

U.S. PATENT DOCUMENTS 5,563,790 A 10/1996 Wada et al.
6,366,842 B1 * 4/2002 Kaji et al. ..................... 701/41

FOREIGN PATENT DOCUMENTS

JP 7-257415 10/1995

* cited by examiner

*Primary Examiner*—Edward Lefkowitz
*Assistant Examiner*—Lilybett Martir
(74) *Attorney, Agent, or Firm*—Christie, Parker and Hale, LLP

(57) ABSTRACT

In a method for determining whether a wheel is locked or not, it is determined whether an output value of a steering torque sensor for detecting steering torque is either equal to or larger than a predetermined threshold value; when the output value is either equal to or larger than the predetermined threshold value, it is determined whether the output value has continued to be either equal to or larger than the predetermined threshold value for more than a predetermined length of time and, when it is determined that the output value of the steering torque sensor has continued to be either equal to or larger than the predetermined threshold value for more than the predetermined length of time, then it is determined that the wheel is locked.

13 Claims, 14 Drawing Sheets

METHOD FOR DETERMINING WHETHER OR NOT WHEELS ARE LOCKED

CROSS REFERENCE TO RELATED APPLICATION

This application claims priority of Japanese Patent Application Number 2002-330589, filed on Nov. 14, 2002.

BACKGROUND OF THE INVENTION

1. Field of the Invention

The present invention relates to a method for determining whether or not wheels are locked for use in an electric power steering control apparatus.

2. Description of the Related Art

An electric power steering control apparatus is one in which steering torque is detected by a torque detector and an auxiliary torque, approximately proportional to the output of the torque detector, is supplied from an electric motor to a steering shaft to assist the steering effort by reducing the force required to turn the steering wheel.

The electric power steering apparatus differs from conventional hydraulically assisted power steering in that the power necessary to assist the steering effort is provided using an electric motor, not by hydraulic pressure. The amount of assist is determined by detecting the amount of twist of the steering shaft and by controlling the motor so as to reduce the amount of twist below a predetermined value. Further, as an output comparable to that produced by hydraulic pressure has to be generated using an electric motor, the electric motor requires large power to operate, and the battery as the power source of the motor must have a capacity that can supply the necessary power to the motor.

It is known to provide an electric power steering control system in which an electromagnetic clutch is controlled with fine accuracy so as to prevent the steering wheel from becoming locked or extremely heavy, thereby preventing unnecessary slippage of the electromagnetic clutch as well as occurrence of noise and impact (for example, Japanese Unexamined Patent Publication No. H07-257415).

There is also known an electric power steering control system in which provisions are made to prevent an excessive current from flowing to the electric motor when the steering system is turned to its maximum steering angle position (for example, Japanese Unexamined Patent Publication No. H11-49014).

Because cost increases, above that of conventional hydraulic control systems, are not acceptable for electric power steering control systems, the cost of each component part is reduced. Accordingly, the power capacity of the motor drive circuit is reduced to the minimum required in order to reduce the cost. As a result, if the output is continued to be produced for a prolonged time when the wheel is in a locked state, the capability of the motor drive circuit will be exceeded. Since the purpose of the electric power steering system is to assist the steering effort, there is no need to provide the steering assist when the wheel is in a locked state or when the steering wheel is turned to the full-lock position.

Under normal conditions, on the other hand, as power assist is provided when the motor is energized, the amount of twist in the steering wheel should decrease. If the amount of twist does not decrease, this means that either the wheel is in a locked state or the steering wheel is turned to the full-lock position, and therefore, no power assist is needed in this condition. However, if the assist is abruptly stopped, the driver will feel unnatural because the steering wheel abruptly becomes heavy.

In view of this situation, it is an object of the present invention to provide a method for determining whether or not wheels are locked. Another object of the invention is to provide a method that takes appropriate measures when it is determined that the wheel is locked.

SUMMARY OF THE INVENTION

According to the present invention, it is determined whether the output value of a steering torque sensor for detecting steering torque is either equal to or larger than a predetermined threshold value; when the output value is either equal to or larger than the predetermined threshold value, it is determined whether the output value has continued to be either equal to or larger than the predetermined threshold value for more than a predetermined length of time and, when it is determined that the output value of the steering torque sensor has continued to be either equal to or larger than the predetermined threshold value for more than the predetermined length of time, then it is determined that the wheel is locked.

In one preferred mode, it is determined whether the torque sensor output value detected in the current cycle of processing is in a state larger than the torque sensor output value detected in the last cycle of processing, and whether the torque sensor output value detected in the current cycle of processing has continued to be in the larger state for more than a predetermined length of time; when it is determined that the torque sensor output value detected in the current cycle of processing has continued to be larger than the torque sensor output value detected in the last cycle of processing for more than the predetermined length of time, then it is determined that the wheel is locked.

When it is determined that the wheel is locked, the motor is de-energized. Or, the electric current to the motor is progressively reduced. In another preferred mode, when it is determined that the wheel is locked, energization of the motor is inhibited while, when it is not determined that the wheel is locked, energization of the motor is permitted. Alternatively, when it is determined that the wheel is locked, the electric current to the motor is progressively reduced, while when it is not determined that the wheel is locked, the electric current to the motor is progressively increased.

Further, according to the present invention, it is determined whether the torque sensor output value detected in the current cycle of processing is in a state larger than the torque sensor output value detected in the last cycle of processing, whether the difference between the two values is greater than a predetermined difference threshold, and whether the torque sensor output value detected in the current cycle of processing has continued to be in the larger state for more than a predetermined length of time; when it is determined that the torque sensor output value detected in the current cycle of processing has continued to be larger than the torque sensor output value detected in the last cycle of processing for more than the predetermined length of time, with the difference between the two values being greater than the predetermined difference threshold, then it is determined that the wheel is locked.

According to the present invention, whether the wheel is locked or not can be accurately determined without having to add any other input, and the control performance can be enhanced, while protecting the control apparatus such as a motor drive circuit against damage.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
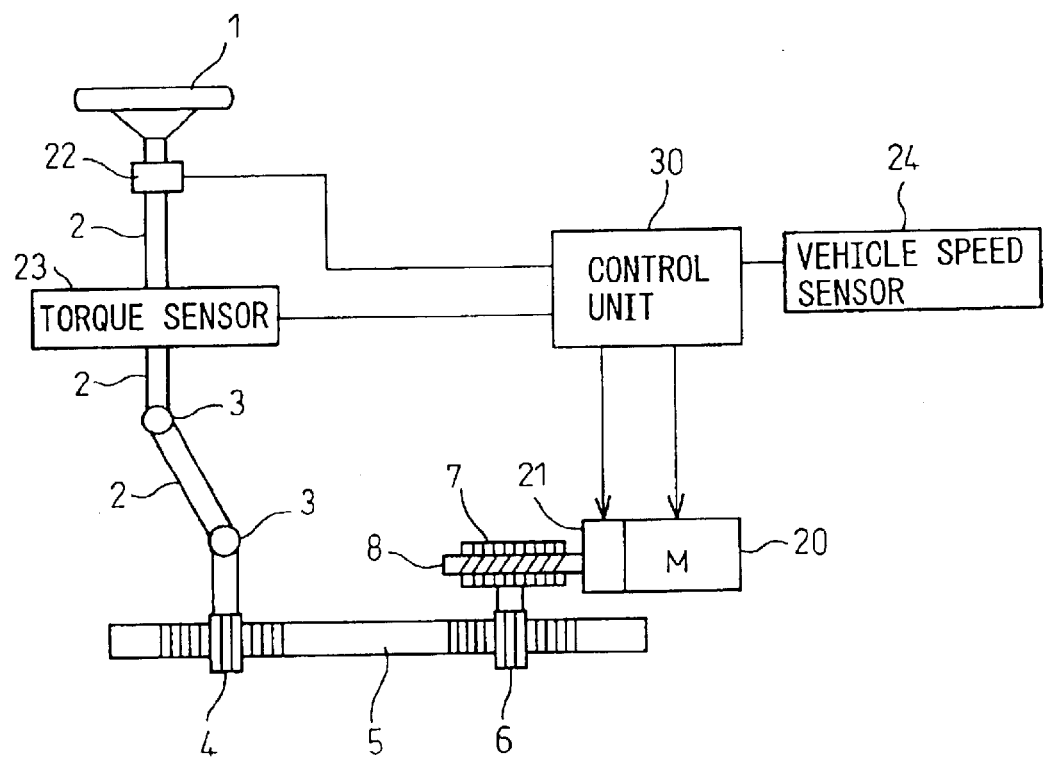
FIG. 1 is a diagram showing one example of a power steering control apparatus in which a method for determining whether or not wheels are locked according to the present invention is used.

FIG. 1 is a diagram showing one example of a known power steering control apparatus in which a method for determining whether or not wheels are locked according to the present invention is used. The rotational force of a steering wheel 1 is transmitted via a plurality of steering shafts 2 connected by universal joints 3. A pinion shaft 4 is mounted at the lower end of the steering shaft assembly 2, and the entire assembly of steering shafts 2 rotates as a rack 5 slides in meshing engagement with the pinion shaft 4 at one end. A pinion shaft 6 clamped to a worm wheel 7 is in meshing engagement with the other end of the rack 5, and the worm wheel 7 meshes with a worm shaft 8. The worm shaft 8 is connected to a motor 20 via an electromagnetic clutch 21, and when the motor 20 is rotated, the worm shaft 8 rotates, causing the worm wheel 7 to move axially and the pinion shaft 6 to rotate, which in turn causes the rack 5 to move axially and thus causes the pinion shaft 6 to rotate. In this way, the rotational force of the motor 10 is transmitted as an auxiliary torque to the steering shafts 2 to facilitate the operation of the steering wheel.

The motor 10 that transmits the auxiliary torque to the steering shafts 2 is controlled by a control unit 30. The control unit 30 is supplied with a signal from a rotational angle sensor 22 which detects the rotational angle of the steering wheel, a signal from a torque sensor 23 which detects steering torque, and a signal from a vehicle speed sensor 24 which detects vehicle speed.

In the present invention, the motor 20 is controlled based on the signal from the torque sensor 23 that detects the steering torque. The torque sensor detects the "twist" between the steering wheel and the steered wheels, and the "twist" occurs when the amount of turn (steering) of the wheel is small compared with the amount of rotation of the steering wheel.

Figure 2:
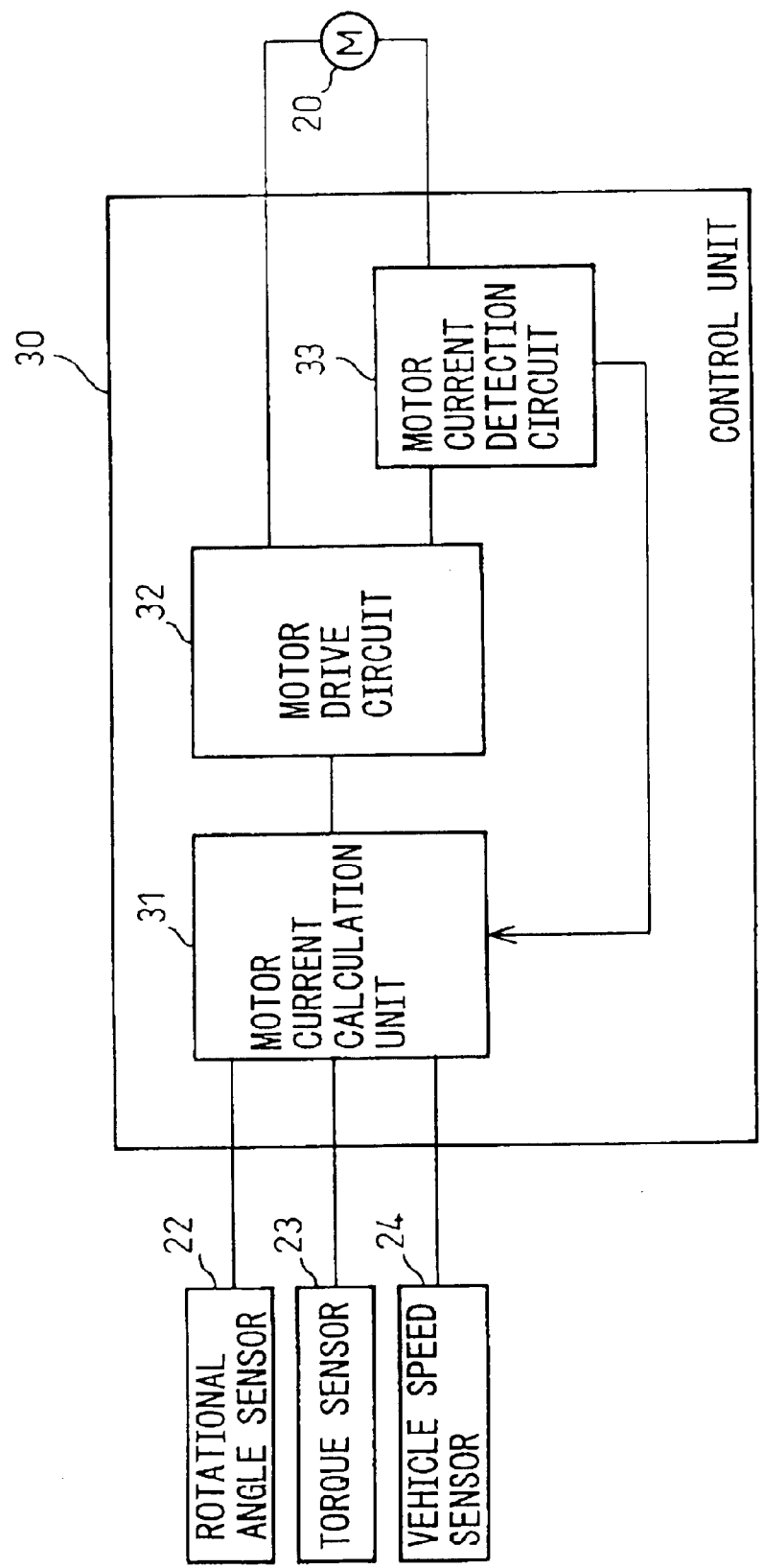
FIG. 2 is a block diagram of a control unit used in the method for determining whether or not wheels are locked of the present invention.

FIG. 2 is a block diagram of the control unit 30. The control unit 30 comprises a motor current calculation unit 31, a motor drive circuit 32, and a motor current detection circuit 33. The control unit 30 receives signals from the rotational angle sensor 22, the torque sensor 23, and the vehicle speed sensor 24, and the motor current calculation unit 31 calculates the current to be supplied to the motor 20; the motor drive circuit 32 is controlled based on the calculated motor current. The motor current detection circuit 33 detects the current from the motor 20 and feeds it back to the motor current calculation unit 31, and the motor current drive circuit is controlled based on the thus fed back value.

Figure 3:
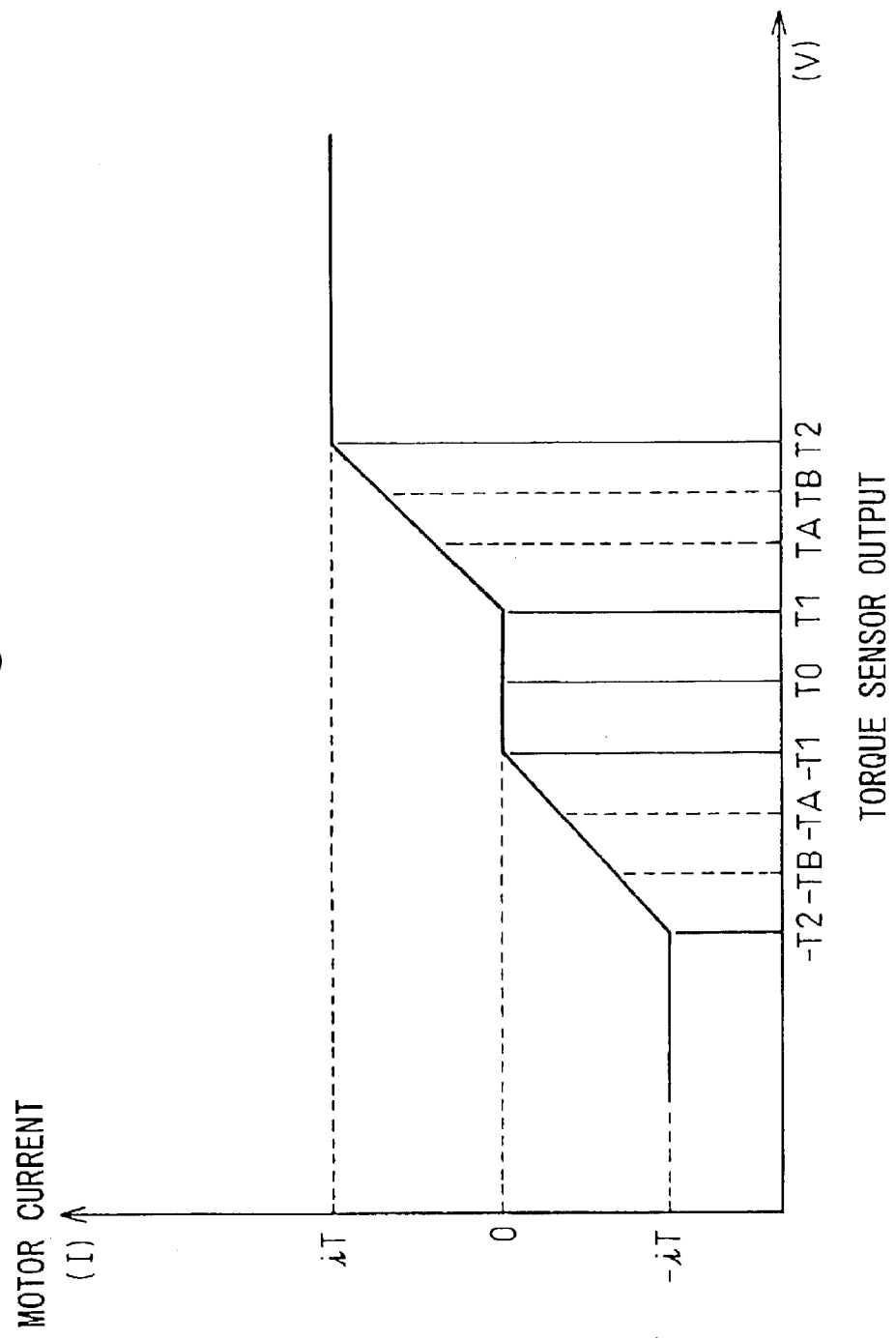
FIG. 3 is a diagram showing the relationship between torque sensor output and motor current according to the present invention.

FIG. 3 is a graph showing one example of the relationship between the output of the torque sensor 23 and the motor current according to the present invention. The output (V) from the torque sensor 23 is plotted along the abscissa, and the electric current value (I) of the motor 20 is plotted along the ordinate as a function of the torque sensor output. T0 represents the midpoint value of the torque sensor output.

The midpoint value T0 of the torque sensor output can be set at an arbitrary value; when it is set at 0 V, if twist occurs as the steering wheel is turned to the right, for example, the torque sensor produces an output of +1 or +2 V, and if twist occurs as the steering wheel is turned to the left, the torque sensor produces an output of −1 or −2 V.

On the other hand, when the midpoint value T0 of the torque sensor output is set at 2.5 V, if twist occurs as the steering wheel is turned to the right, for example, the torque sensor produces an output of +3 or +3.5 V, and if twist occurs as the steering wheel is turned to the left, the torque sensor produces an output of 2 or 1.5 V.

The embodiments hereinafter given are described for the case where the midpoint value T0 of the torque sensor output is set at 0 V.

In the graph shown in FIG. 3, if twist occurs as the steering wheel is turned to the right, a signal (in this case, voltage V) corresponding to the amount of twist is output from the torque sensor, but no current flows to the motor until the output reaches T1. This allows for play in the steering wheel. When the output from the torque sensor increases beyond T1, the electric current value of the motor increases in proportion to the output, and the current reaches iT when the output of the torque sensor increases to T2. However, if the output increases beyond T2, the motor current does not increase but remains at iT.

Similarly, if twist occurs as the steering wheel is turned to the left, a signal corresponding to the amount of twist is output from the torque sensor, but no current flows to the motor until the output reaches −T1. Here, −T1 shows that the direction of twist is opposite. When the output from the torque sensor increases in magnitude beyond −T1, the absolute value of the motor current increases in proportion to the output, and the current reaches −iT when the output of the torque sensor increases in magnitude to −T2. Here, the sign "−" indicates that the direction of the current flowing in the motor is the opposite direction. If the magnitude of the output increases beyond −T2, the motor current does not increase in magnitude but remains at −iT.

[Embodiment]1

Figure 4:
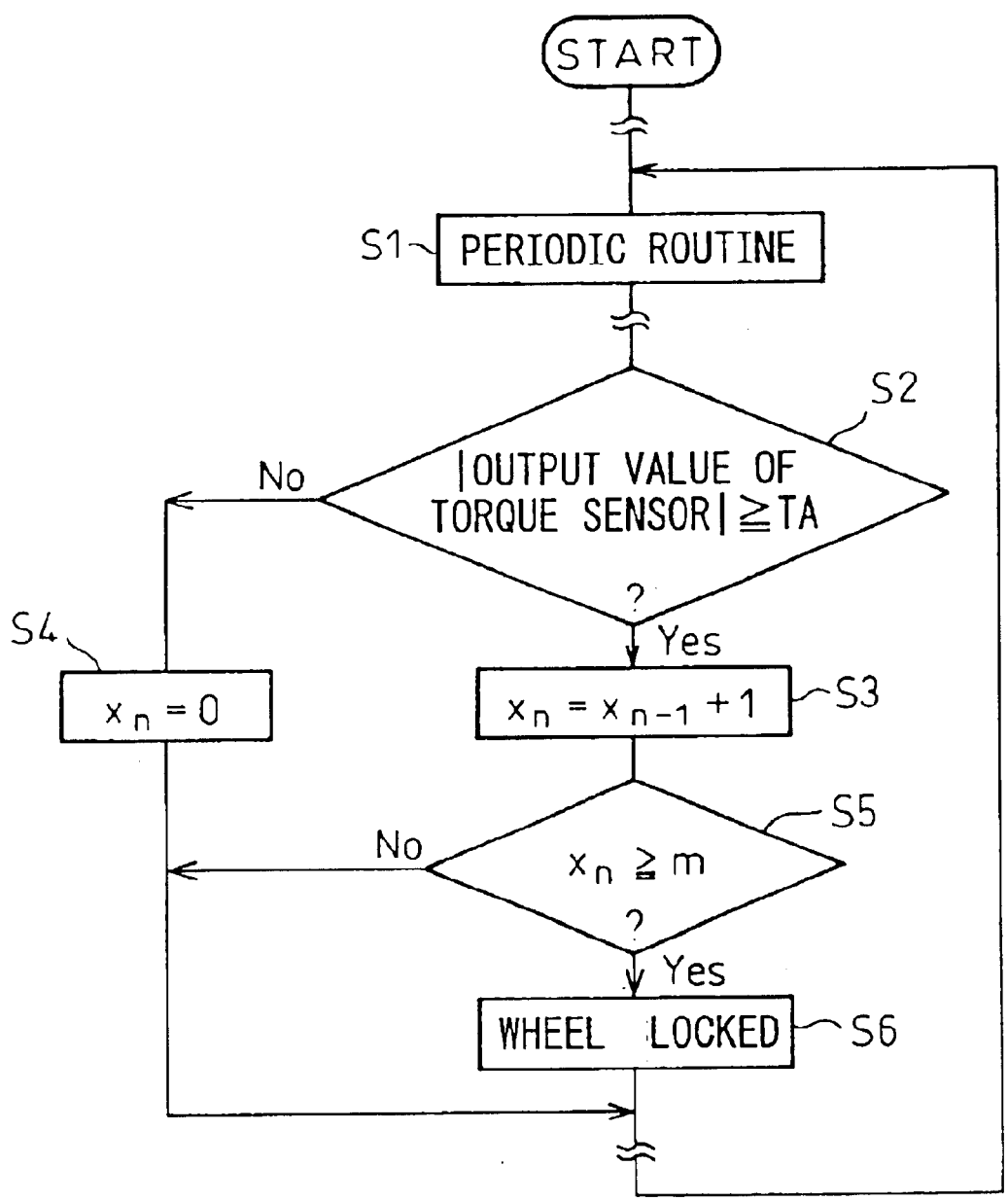
FIG. 4 is a flowchart illustrating an embodiment of the method of the present invention.

FIG. 4 is a flowchart illustrating one embodiment of the method of the present invention. The operation shown in this flowchart is controlled by the control unit 30 of FIG. 1. The same applies to the other embodiments hereinafter given. In the embodiment shown in FIG. 4, if the twisted condition of the steering wheel has continued for more than a predetermined length of time, it is determined that the wheel is locked, and the wheel locked state is thus detected.

In FIG. 4, first a periodic routine is entered (S1). The periodic routine is called at periodic intervals of time to perform prescribed processing. Undulating lines in the flowchart indicate that other processing is inserted as needed in the flowchart. This also applies to the other embodiments.

Next, it is determined whether the absolute value of the torque sensor output is either equal to or greater than a predetermined threshold TA (S2). In this embodiment, since the midpoint value T0 of the torque sensor output is set at 0 V, the absolute value of the torque sensor output corresponds to the amount of twist in the steering wheel. If the answer is Yes, that is, if the absolute value of the torque sensor output is either equal to or greater than TA, this means that a twist has occurred in the steering wheel; therefore, previous counter value $x_{n-1}$ is incremented by 1, that is, $x_n = x_{n-1} + 1$ (S3).

On the other hand, if the absolute value of the torque sensor output is smaller than TA (No), the count value is reset to 0 (S4). Next, it is determined whether the count value $x_n$ is either equal to or greater than a predetermined threshold m (S5). If the count value $x_n$ is either equal to or greater than the threshold m (Yes), it is determined that the twisted condition of the steering wheel has continued for more than a predetermined length of time, and the situation is determined as being a wheel locked state (S6). If the answer is No, the situation is not determined as being a wheel locked state.

As shown in FIG. 3, the threshold TA can be set at an arbitrary value between T1 and T2 and between −T1 and −T2.

[Embodiment]2

Figure 5:
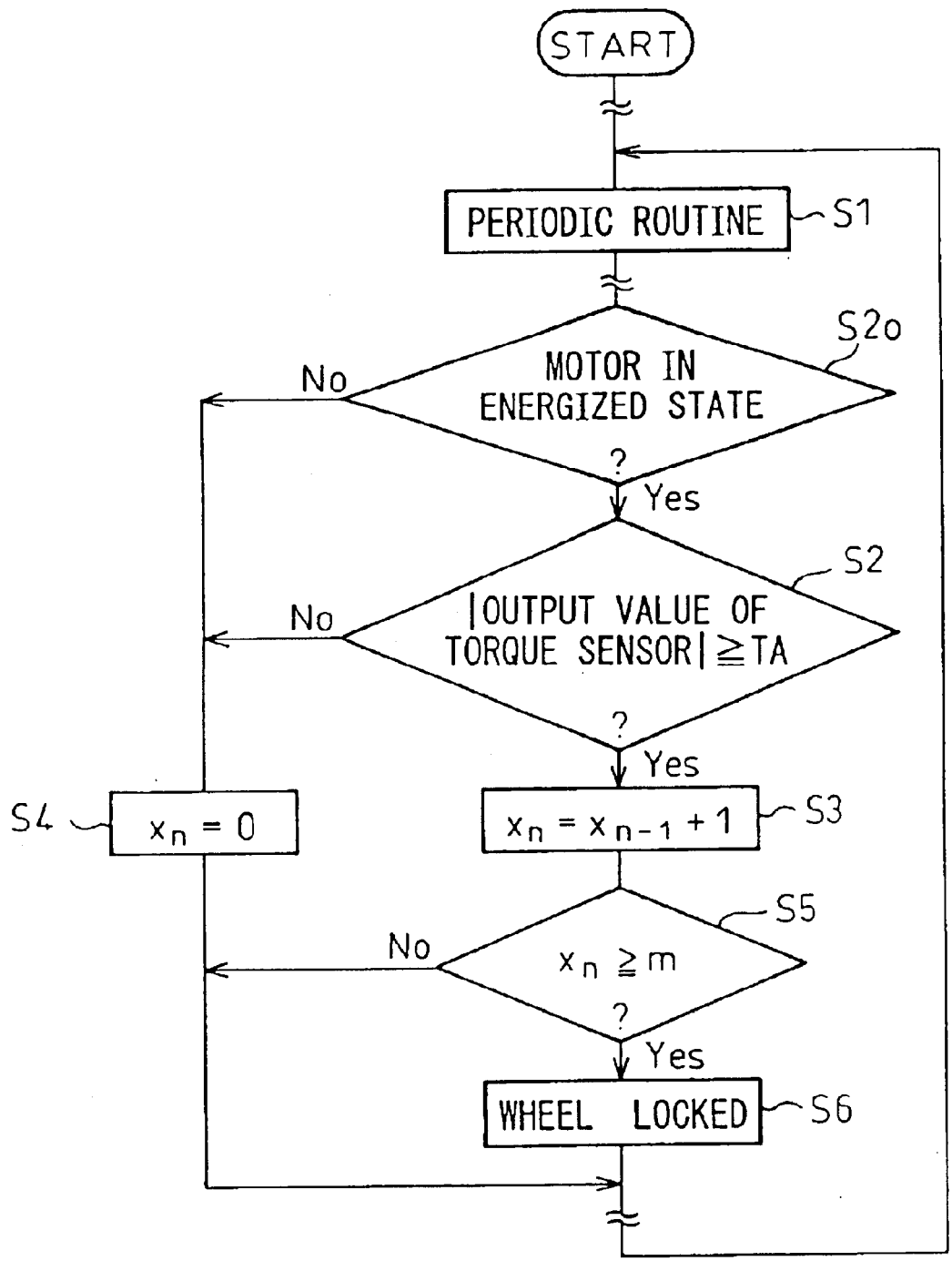
FIG. 5 is a flowchart illustrating an embodiment of the method of the present invention.

The embodiment shown in FIG. 5 differs from that shown in the flowchart of FIG. 4 by the inclusion of step $S2_0$. In $S2_0$, it is determined whether the motor is in the energized state or not and, when the motor is in the energized state, is a determination made as to whether the torque sensor output is either equal to or greater than the predetermined threshold TA (S2). The process thereafter is the same as that shown in FIG. 4. In the embodiment shown in FIG. 5, when the motor is not in the energized state, the determination as to whether the wheel is locked or not is not made because, in that state, the twist in the steering wheel does not necessarily decrease. In the flowchart shown in FIG. 5, if No in step $S2_0$, the count value $x_n$ is reset to 0 (S4).

[Embodiment]3

Figure 6:
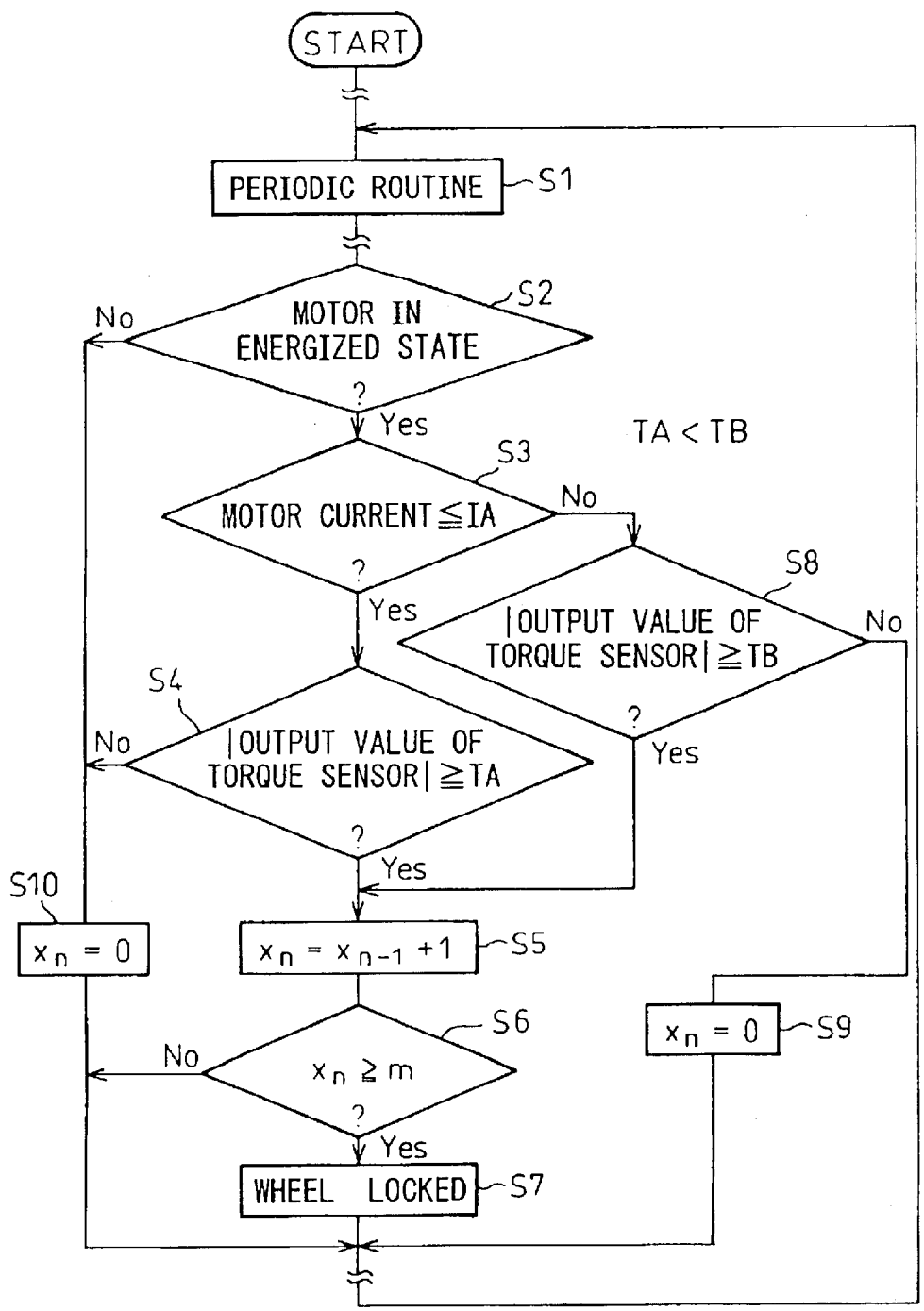
FIG. 6 is a flowchart illustrating an embodiment of the method of the present invention.

FIG. 6 is a flowchart illustrating an embodiment in which the threshold of the torque sensor output is varied according to the electric current value of the motor when determining whether the wheel is locked or not.

First, the periodic routine is entered (S1), and a determination is made as to whether the motor is in the energized state or not (S2). If it is in the energized state (Yes), then it is determined whether the electric current value of the motor is either equal to or smaller than a predetermined threshold IA (S3). If Yes in S3, that is, if the electric current value of the motor is either equal to or smaller than the threshold IA, it is determined whether the absolute value of the torque sensor output is either equal to or greater than the predetermined threshold TA (S4). If the answer is Yes, that is, if the torque sensor output is either equal to or greater than the threshold TA, this means that a twist has occurred in the steering wheel; therefore, the previous counter value $x_{n-1}$ is incremented by 1, that is, $x_n = x_{n-1} + 1$ (S5). On the other hand, if the absolute value of the torque sensor output is smaller than the threshold TA (No), the count value $x_n$ is reset to 0 (S10).

On the other hand, if No in S3, that is, if the electric current value of the motor is greater than IA, it is determined whether the absolute value of the torque sensor output is either equal to or greater than TB (S8). Here, TB>TA. That is, when the motor current is small, the threshold is reduced, and when the motor current is large, the threshold is increased. This is because, when the motor current is small, the absolute value of the torque sensor output should also be small; therefore, when the output of the torque sensor is small, if the torque sensor is continuously producing an output that is not smaller than the predetermined value, this means that the wheel is blocked.

If Yes in S8, this means that a twist has occurred in the steering wheel; therefore, previous counter value $x_{n-1}$ is incremented by 1, that is, $x_n = x_{n-1} + 1$ (S5). On the other hand, if the absolute value of the torque sensor output is smaller than the threshold TB (No), the count value $x_n$ is reset to 0 (S9).

Next, it is determined whether the count value $x_n$ is either equal to or greater than the predetermined threshold m (S6). If the count value is either equal to or greater than the threshold m (Yes), it is determined that the twisted condition of the steering wheel has continued for more than a predetermined length of time, and the situation is determined as being a wheel locked state (S7). If the answer is No, the situation is not determined as being a wheel locked state.

[Embodiment]4

Figure 7:
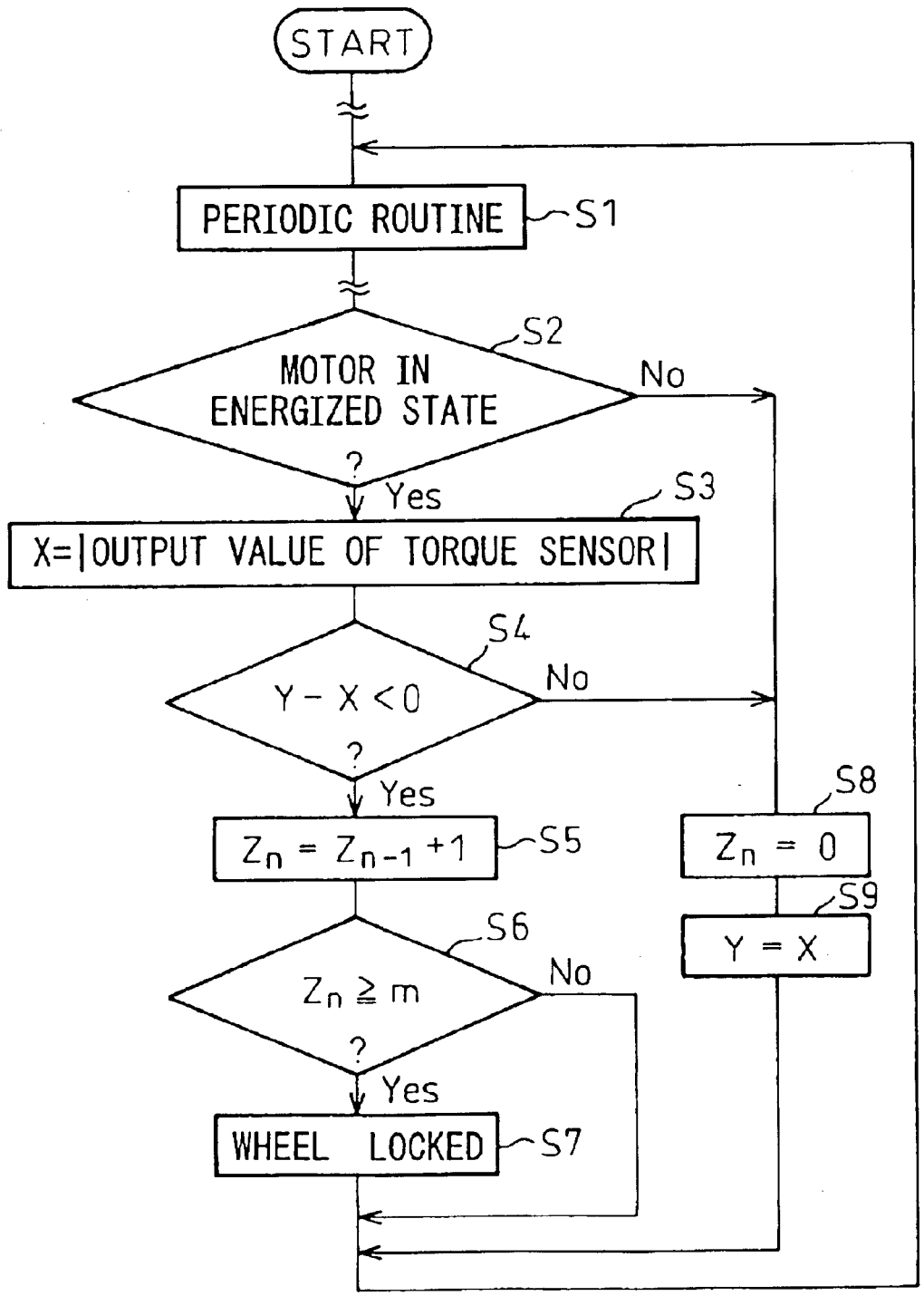
FIG. 7 is a flowchart illustrating an embodiment of the method of the present invention.

FIG. 7 is a flowchart illustrating an embodiment in which it is determined that the wheel is locked if the output of the torque sensor does not decrease even though the motor is in the energized state.

In FIG. 7, first, the periodic routine is entered (S1). Next, it is determined whether the motor is in the energized state or not (S2). If it is in the energized state (Yes), the absolute value X of the torque sensor output detected in the current cycle of processing is calculated (S3), and it is determined whether Y−X<0, that is, whether Y<x (S4). Y is the absolute value of the torque sensor output detected in the previous cycle of processing. If the answer is Yes, this means that the output of the torque sensor, and hence the amount of twist in the steering wheel, has increased from the previous cycle of the routine, and there is the possibility that the wheel is in a locked state. Accordingly, previous counter count value $Z_{n-1}$ is incremented by 1, that is, $Z_n = Z_{n-1} + 1$ (S5).

On the other hand, if Y is not smaller than X (No), this means that the output of the torque sensor has decreased from the previous cycle of the routine. This in turn means that the amount of twist in the steering wheel has decreased, and therefore that there is no possibility that the wheel is in a locked state; accordingly, the count value $Z_n$ is reset to 0 (S8), and Y is replaced by X (S9).

Next, it is determined whether the count value $Z_n$ is either equal to or greater than the predetermined threshold m (S6). If the count value $Z_n$ is either equal to or greater than the threshold m (Yes), it is determined that the twisted condition of the steering wheel has continued for more than a predetermined length of time, and the situation is determined as being a wheel locked state (S7). If the answer is No, the situation is not determined as being a wheel locked state.

If No in S2, there is no possibility that the wheel is in a locked state; accordingly, the count value $Z_n$ is reset to 0 (S8), and Y is replaced by X (S9).

[Embodiment]5

Figure 8:
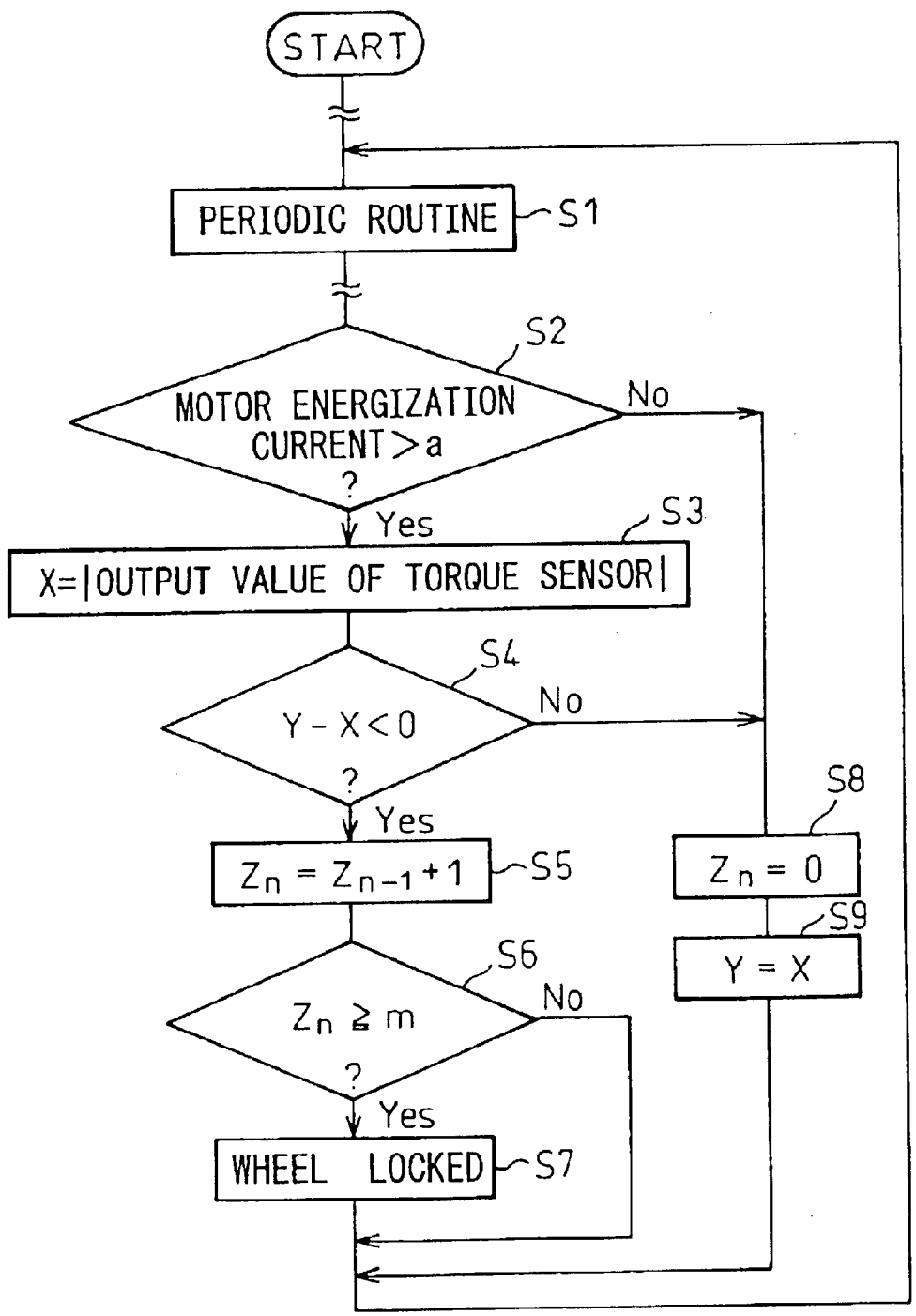
FIG. 8 is a flowchart illustrating an embodiment of the method of the present invention.

FIG. 8 is a modification of the flowchart shown in FIG. 7. The difference from the flowchart shown in FIG. 7 is that in S2, it is determined whether or not the motor current is greater than "a".

When there is no twist occurring in the steering wheel, no current flows to the motor. Accordingly, in the flowchart of FIG. 7, the determination as to whether the wheel is locked or not is made only when the motor is in the energized state. However, even when the motor is in the energized state, if the electric current value is small, the twist in the steering wheel is small. Therefore, the determination as to whether the wheel is locked or not should be made when the electric current value of the motor is larger than a predetermined value.

In the flowchart of FIG. 8, first, the periodic routine is entered (S1). Next, it is determined whether or not the motor energization current is greater than "a" (S2). If the answer is Yes, the absolute value X of the torque sensor output is calculated (S3). If the answer is No, there is no possibility that the wheel is in a locked state; accordingly, the count value $Z_n$ is reset to 0 (S8), and Y is replaced by X (S9).

[Embodiment]6

Figure 9:
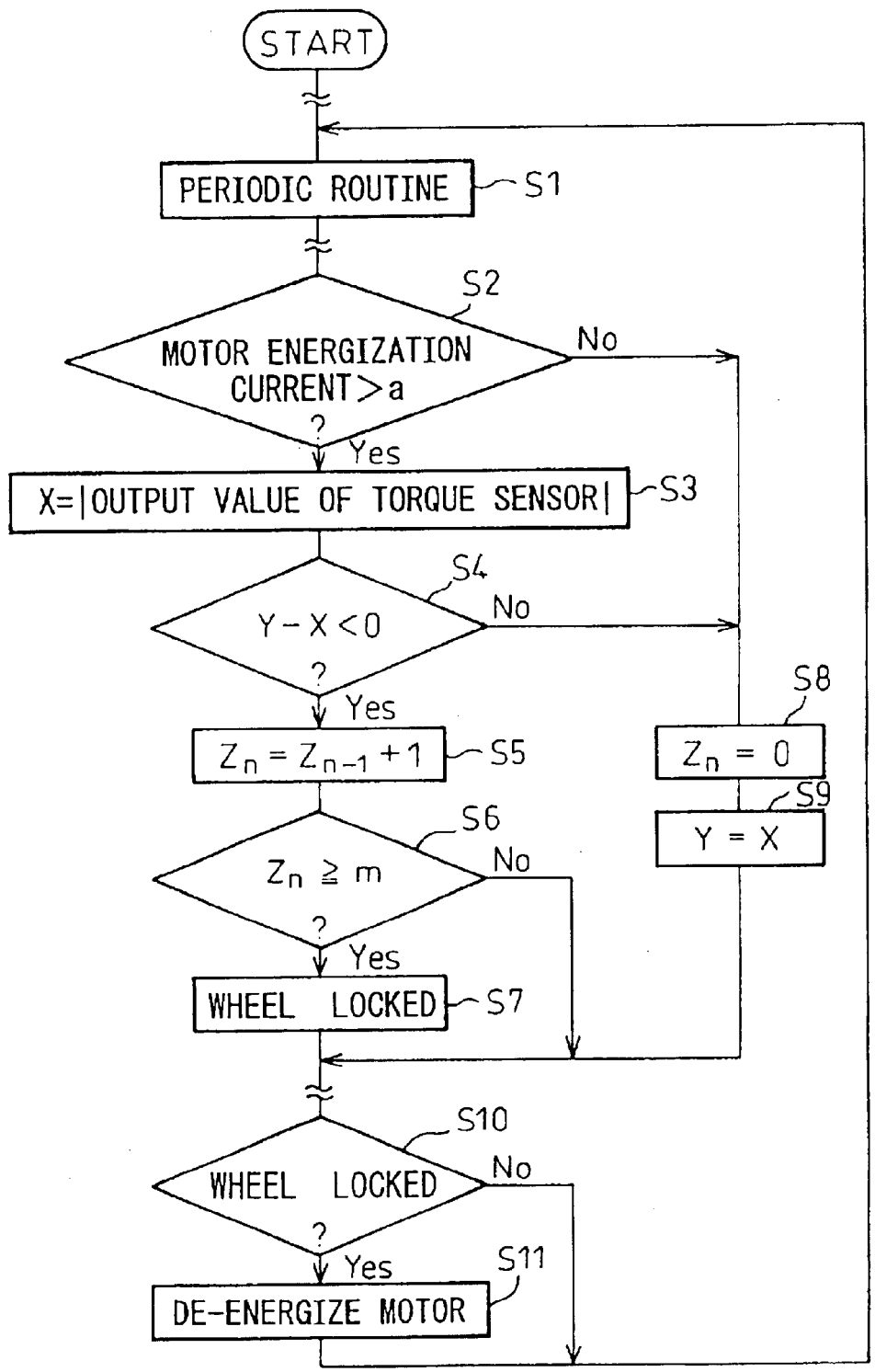
FIG. 9 is a flowchart illustrating an embodiment of the method of the present invention.

In the flowchart shown in FIG. 9, the motor is de-energized when it is determined that the wheel is in a locked state in the flowchart of FIG. 8.

In FIG. 9, the process from S1 to S9 is the same as that shown in FIG. 8, and will not be described here. In the flowchart of FIG. 9, it is determined in S10 whether the wheel is locked or not. When it is determined in S7 that the wheel is locked, it is also determined in S10 that the wheel is locked (Yes), and the motor is de-energized (S11). On the other hand, when $Z_n=0$ in S8, the wheel is not in a locked state, and therefore, the motor is not de-energized.

[Embodiment]7

Figure 10:
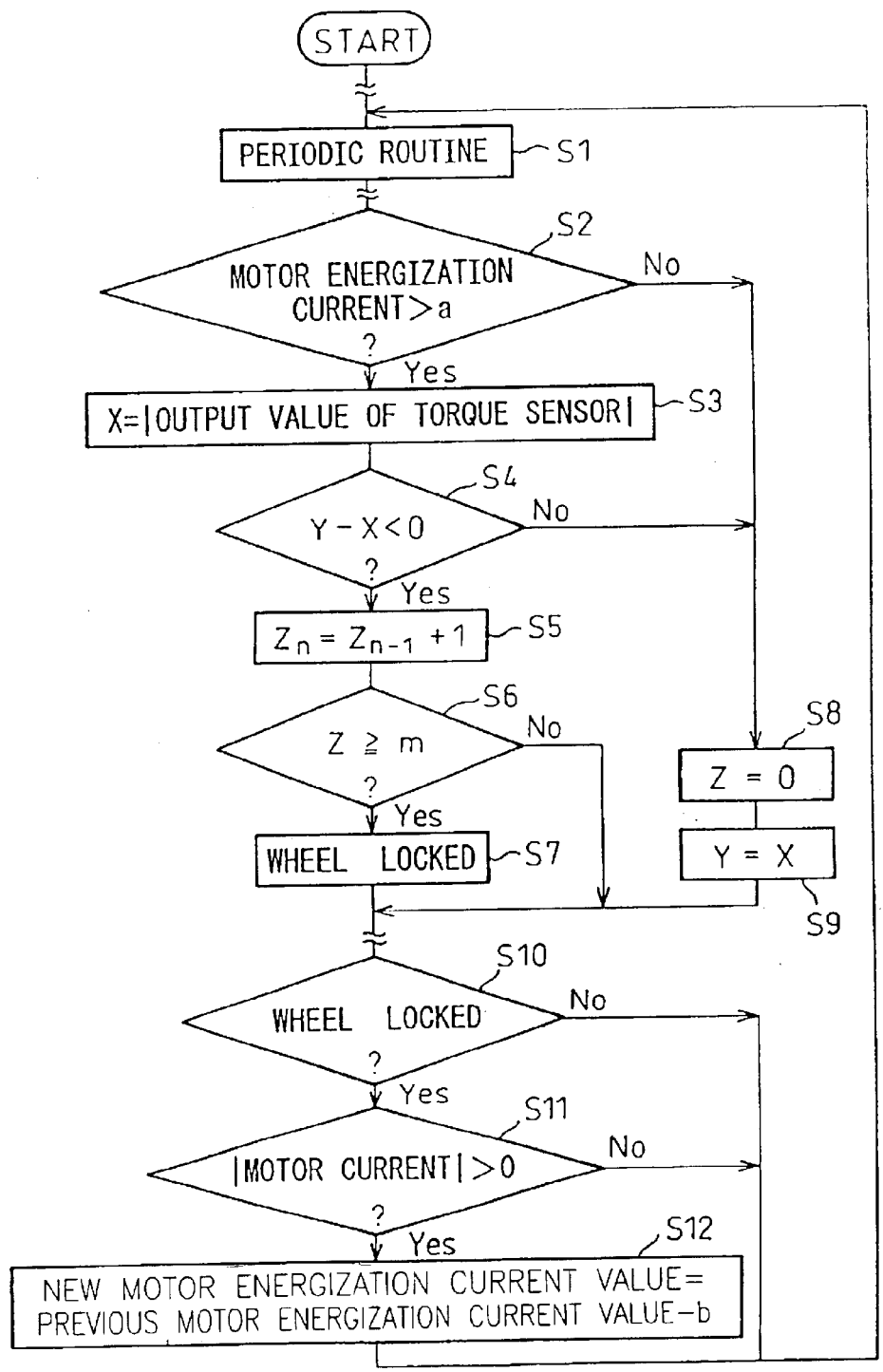
FIG. 10 is a flowchart illustrating an embodiment of the method of the present invention.

In the flowchart shown in FIG. 10, the motor current is progressively reduced when it is determined that the wheel is in a locked state in the flowchart of FIG. 8.

In FIG. 10, the process from S1 to S9 is the same as that shown in FIG. 8, and will not be described here. In S10, it is determined whether the wheel is locked or not; when it is determined in S7 that the wheel is locked, the answer in S10 is Yes. Next, it is determined whether electric current is flowing to the motor (S11). If Yes in S11, a new motor energization current value is set by subtracting a prescribed electric current value "b" from the previous motor energization current value (S12). Here, the prescribed electric current value "b" is set suitably as needed.

In this way, by reducing the motor energization current value, the amount of steering assist is reduced. Accordingly, if the same condition is detected each time the routine shown in FIG. 10 is repeated, the value of the current flowing to the motor progressively decreases, and, thus, the amount of steering assist is progressively reduced. As the amount of assist progressively decreases, the steering wheel progressively becomes heavy, thus preventing the steering wheel from becoming abruptly heavy.

If the answer in S10 or S11 is No, the value of the current flowing to the motor is not reduced.

[Embodiment]8

Figure 11:
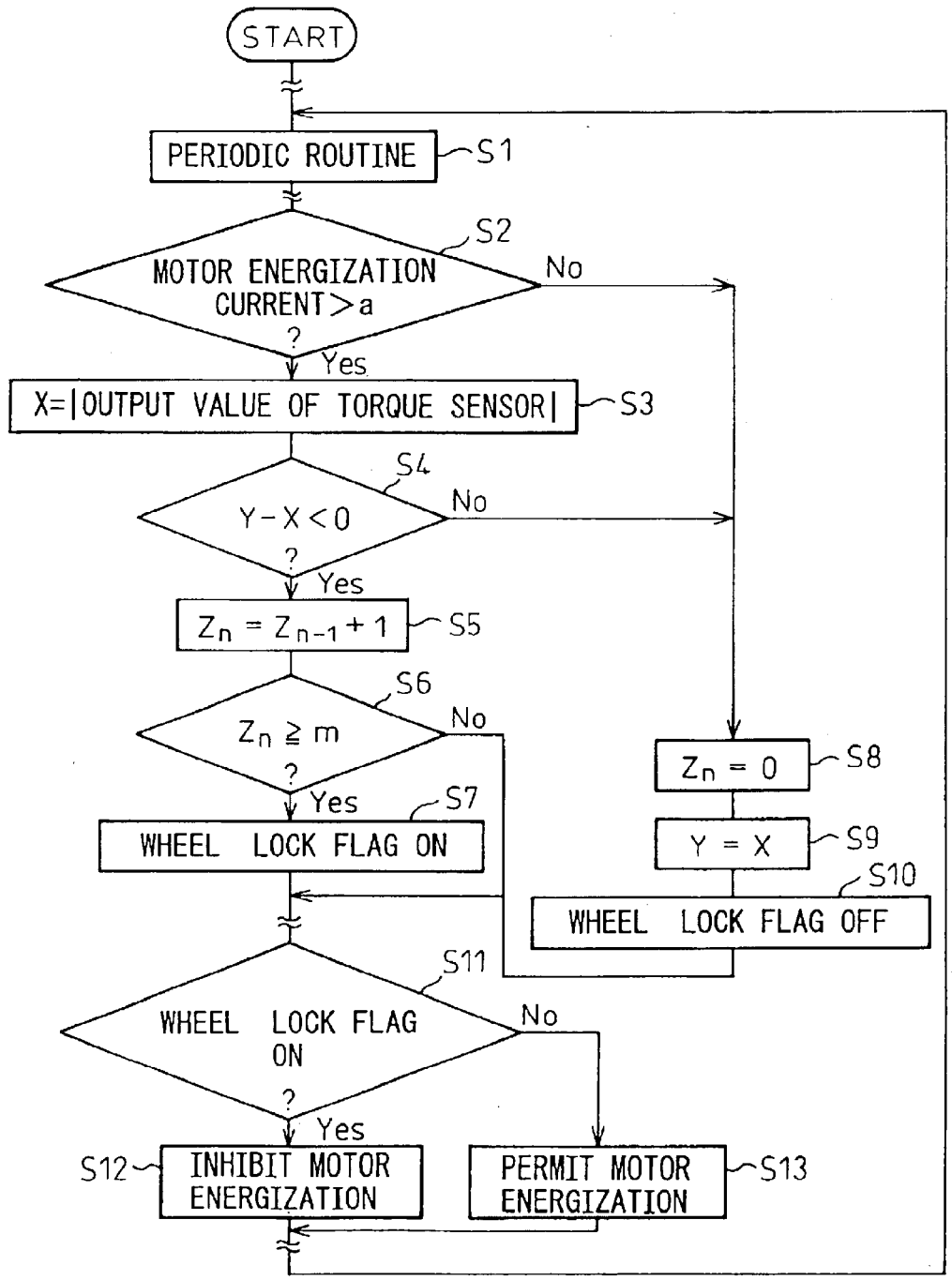
FIG. 11 is a flowchart illustrating an embodiment of the method of the present invention.

In the flowchart shown in FIG. 11, if it is determined in the flowchart of FIG. 8 that the wheel is in a locked state, a wheel lock flag is set ON, but if not, the wheel lock flag is set OFF, thus inhibiting or permitting the energization of the motor according to the ON-OFF state of the flag.

In FIG. 11, the process from S1 to S6 is the same as that shown in FIG. 8, and will not be described here. If the answer in S6 is Yes, that is, if it is determined that the wheel is in a locked state, the wheel block flag is set ON (S7). S8 and S9 are the same as the corresponding steps in the flowchart of FIG. 8; here, since $Z_n=0$ in S8, it is not determined that the wheel is in a locked state. As a result, the wheel lock flag is set OFF in S10.

Next, in S11, it is determined whether the wheel lock flag is ON or not. If the answer is Yes, the energization of the motor is inhibited (S12), but if No, the energization of the motor is permitted (S13).

[Embodiment]9

Figure 12:
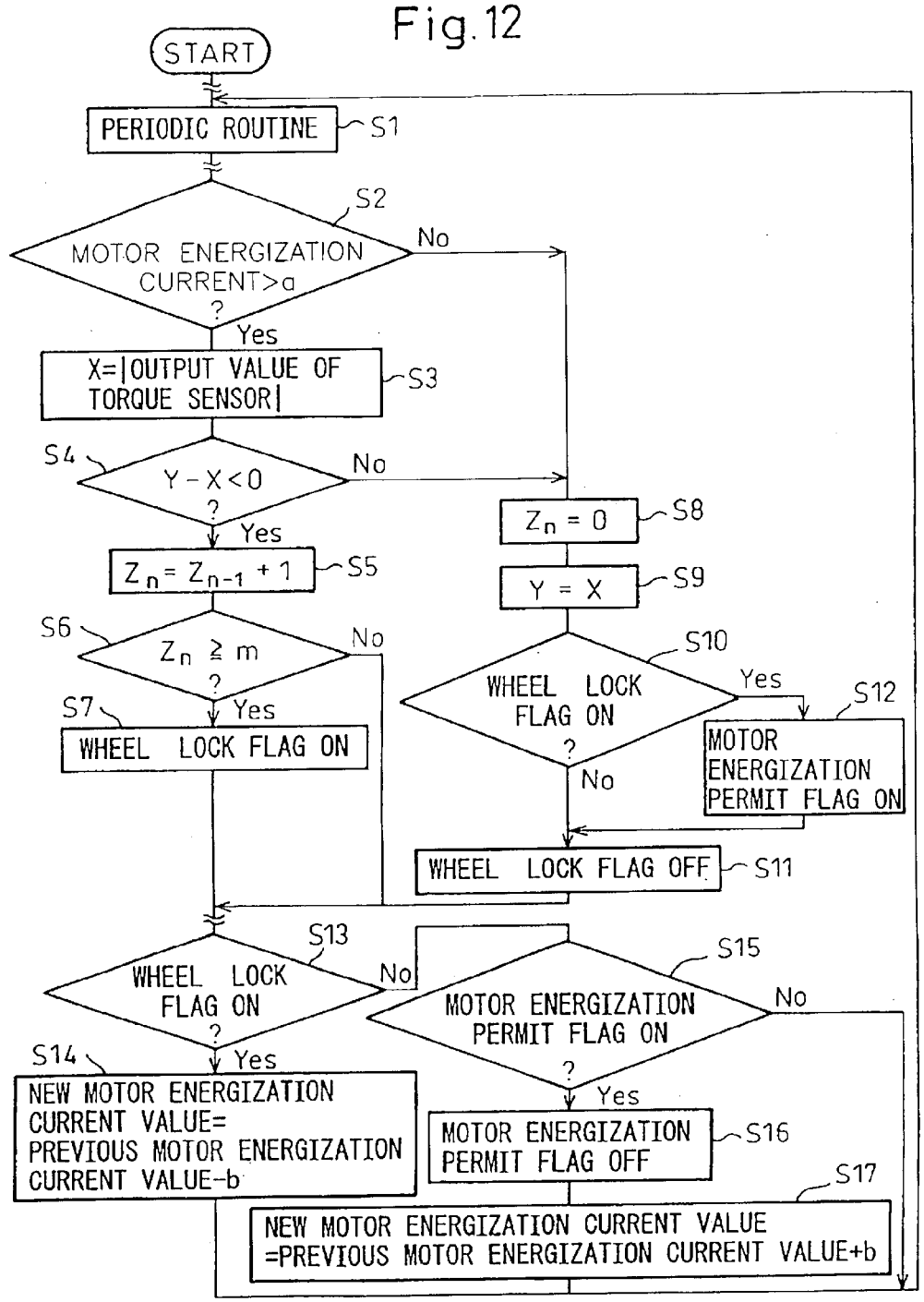
FIG. 12 is a flowchart illustrating an embodiment of the method of the present invention.

In the flowchart shown in FIG. 12, if it is determined in the flowchart of FIG. 8 that the wheel is in a locked state, the wheel lock flag is set ON; otherwise, but if not, it is determined whether the wheel lock flag is ON or not, and the motor current value is increased or reduced according to the result of the determination.

In FIG. 12, the process from S1 to S6 is the same as that shown in FIG. 8, and will not be described here. If the answer in S6 is Yes, in the flowchart of FIG. 12, the wheel lock flag is set ON (S7). If the answer in S6 is No, the wheel lock flag is not set ON.

On the other hand, S8 and S9 are the same as the corresponding steps in the flowchart of FIG. 8, but the difference is that S9 is followed by S10 in which it is determined whether the wheel lock flag is ON or not. If No in S10, the wheel lock flag remains OFF (S11). On the other hand, if the wheel lock flag is already set ON in the previous or earlier cycle of the routine, the answer in S10 is Yes. However, since it is determined in S2 that the motor energization current is not greater than "a", the motor current is already reduced. It is therefore determined that the wheel lock state is cleared and the situation has returned to normal, and a motor energization permit flag is set ON (S12) in order to permit the motor current to restore to the normal state. Then, the wheel )lock flag is set OFF (S11).

Next, it is determined whether the wheel lock flag is ON or not (S13). If Yes in S13, a new motor electric current value is set by subtracting a prescribed electric current value "b" from the previous motor electric current value (S14). In this way, by reducing the motor energization current value, the amount of steering assist is reduced. Accordingly, if the same condition is detected each time the routine shown in FIG. 12 is repeated, the value of the current flowing to the motor progressively decreases, and, thus, the amount of steering assist is progressively reduced. As the amount of assist progressively decreases, the steering wheel progressively becomes heavy, thus preventing the steering wheel from becoming abruptly heavy.

If the answer in S13 is No, it is determined whether the motor energization permit flag is ON or not (S15). If Yes in S15, the motor electric current is permitted to be restored to the normal state, so that the motor energization permit flag is set OFF (S16). This is done to prevent the motor current from increasing abruptly. Then, a new motor electric current value is set by adding the prescribed electric current value "b" to the previous motor electric current value (S17). Accordingly, if the same condition is detected each time the routine is repeated, the value of the current flowing to the motor progressively increases.

[Embodiment]10

Figure 13:
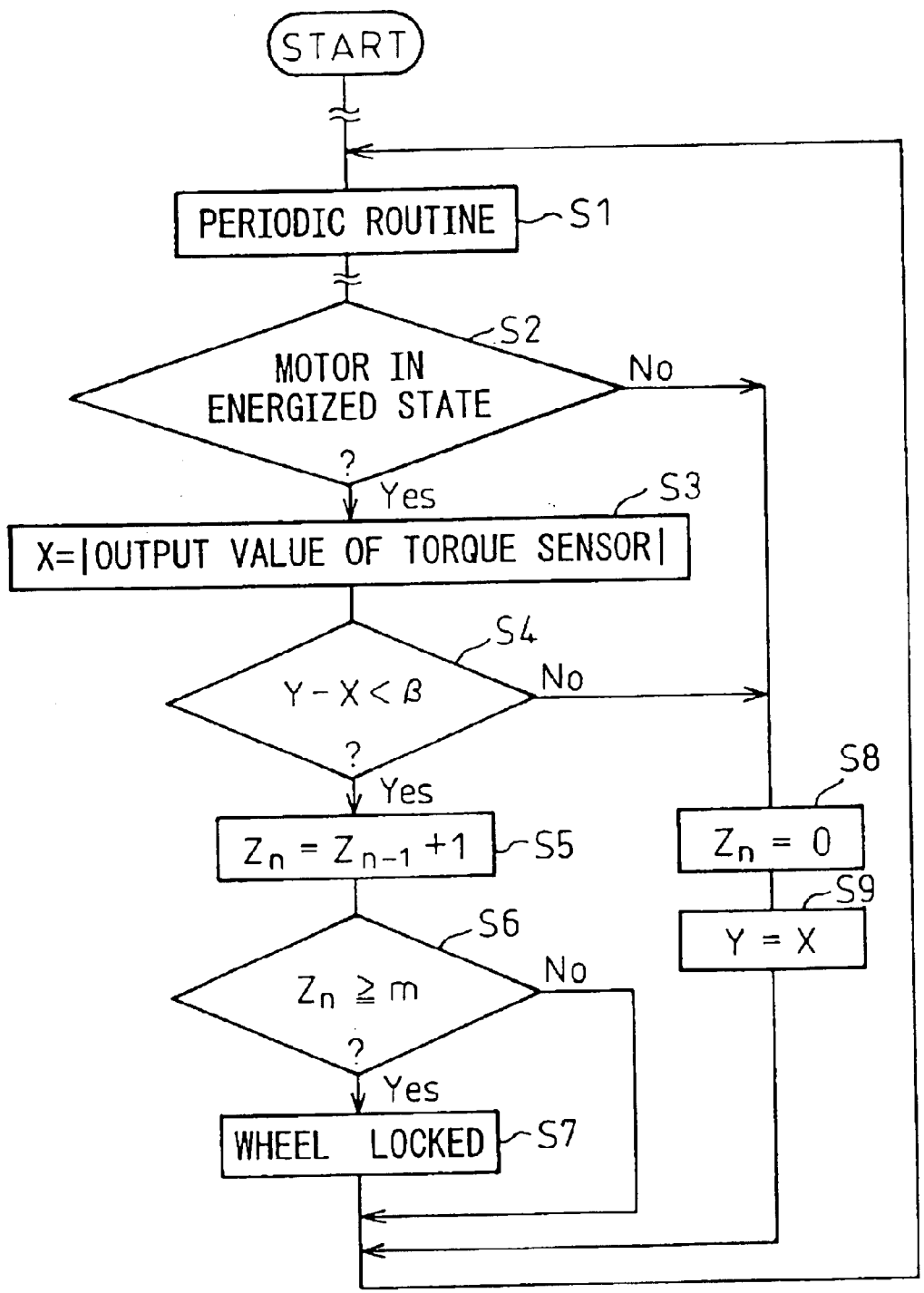
FIG. 13 is a flowchart illustrating an embodiment of the method of the present invention.

FIG. 13 is a modification of the flowchart shown in FIG. 7. The difference from the flowchart shown in FIG. 7 is that, in S4, it is determined whether $X-Y<\beta$. Here, it is checked whether the absolute value X calculated in the current cycle is not simply smaller than the absolute value Y calculated in the previous cycle, but also the difference between Y and X is smaller than a predetermined threshold β (hereinafter referred to as the "difference threshold").

If X−Y<β in S4 (Yes), that is, if the difference between Y and X is smaller than the difference threshold β, it cannot be said that the amount of twist in the steering wheel has definitely decreased. Accordingly, previous counter count value $Z_{n-1}$ is incremented by 1, that is, $Z_n=Z_{n-1}+1$ (S5). Next, it is determined whether the count value $Z_n$ is either equal to or greater than the predetermined threshold m (S6). If the count value $Z_n$ is either equal to or greater than the threshold m (Yes), it is determined that the twisted condition of the steering wheel has continued for more than a predetermined length of time, and the situation is determined as being a wheel locked state (S7). If the answer is No, the situation is not determined as being a wheel locked state.

On the other hand, if Y−X is not smaller than β (No), this means that the amount of twist in the steering wheel has definitely decreased; accordingly, the count value $Z_n$ is reset to 0 (S8), and Y is replaced by X (S9).

In this way, by determining whether X is not simply smaller than the previous value Y, but also the difference is larger than the threshold value β, it can be determined whether the amount of twist in the steering wheel has definitely decreased.

[Embodiment]11

Figure 14:
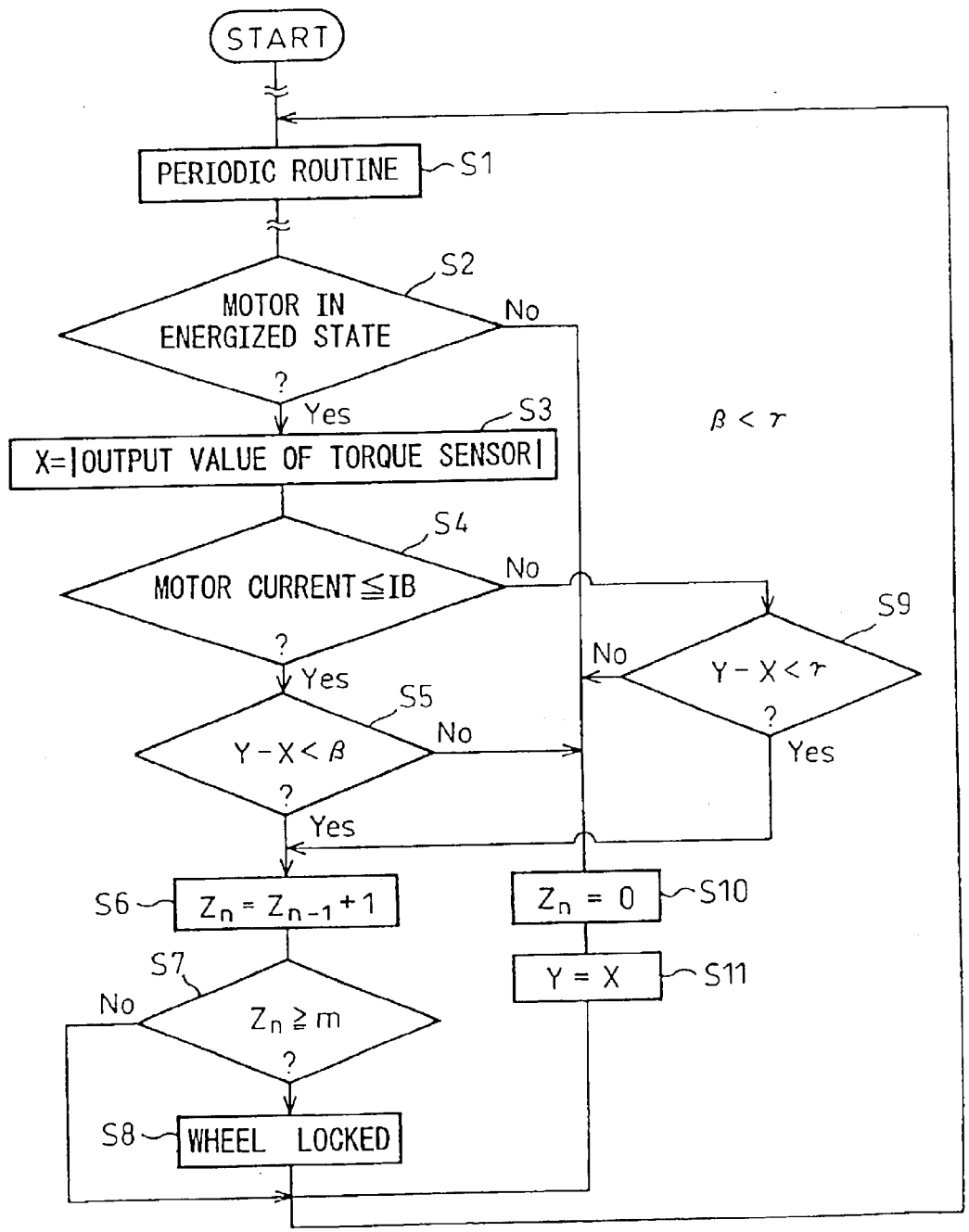
FIG. 14 is a flowchart illustrating an embodiment of the method of the present invention.

The flowchart shown in FIG. 14 differs from the flowchart shown in FIG. 13 in that the above threshold value is varied according to the electric current value of the motor.

In FIG. 14, first the periodic routine is entered (S1). Next, it is determined whether the motor is in the energized state or not (S2). If it is in the energized state (Yes), the absolute value X of the torque sensor output is calculated (S3).

Next, it is determined whether the motor current is either equal to or smaller than a predetermined threshold IB (S4). If Yes in S4, then it is determined whether Y−X<β (S5). If Y−X<β in S5 (Yes), that is, if the difference between Y and X is smaller than the difference threshold β, it cannot be said that the amount of twist in the steering wheel has definitely decreased. Accordingly, the previous counter count value $Z_{n-1}$ is incremented by 1, that is, $Z_n=Z_{n-1}+1$ (S6). Next, it is determined whether the count value $Z_n$ is either equal to or greater than the predetermined threshold m (S7). If the count value $Z_n$ is either equal to or greater than the threshold m (Yes), it is determined that the twisted condition of the steering wheel has continued for more than a predetermined length of time, and the situation is determined as being a wheel locked state (S8). If the answer is No, the situation is not judged as being a wheel locked state.

If, in S5, Y−X is not smaller than β (No), that is, X is smaller than Y, and the difference is greater than the difference threshold β, this means that the amount of twist in the steering wheel has definitely decreased; accordingly, the count value $Z_n$ is reset to 0 (S10), and Y is replaced by X (S11).

On the other hand, if the electric current value of the motor is larger than IB in S4 (No), then it is determined whether Y−X<γ (S9). Here, γ is a difference threshold, where β<γ. If Y−X<γ in S9 (Yes), that is, if the difference between Y and X is smaller than γ, it cannot be said that the amount of twist in the steering wheel has definitely decreased compared with the motor current value. Accordingly, the previous counter count value $Z_{n-1}$ is incremented by 1, that is, $Z_n=Z_{n-1}+1$ (S6). On the other hand, if Y−X is not smaller than γ (No), that is, X is smaller than Y, and the difference is greater than the difference threshold γ, this means that the amount of twist in the steering wheel has definitely decreased; accordingly, the count value $Z_n$ is reset to 0 (S10), and Y is replaced by X (S11).

Each of the above embodiments has been described for the case where the midpoint value T0 of the torque sensor output is set at 0 V. However, the midpoint value T0 may be set, for example, at 2.5 V. When the midpoint value T0 of the torque sensor output is set at 2.5 V, if twist occurs as the steering wheel is turned to the right, for example, the torque sensor produces an output of +3 or +3.5 V; then 3 V (torque sensor output)−2.5 V (midpoint value T0)=0.5 V or 3.5 V (torque sensor output)−2.5 V (midpoint value T0)=1.0 V On the other hand, if twist occurs as the steering wheel is turned to the left, the torque sensor produces an output of +2 or +1.5 V; then 2 V (torque sensor output)−2.5 V (midpoint value T0)=−0.5 V or 1.5 V (torque sensor output)−2.5 V (midpoint value T0)=−1.0 V Therefore, when the midpoint value T0 is not 0, the absolute value of the difference between the torque sensor output and the midpoint value T0 is taken as the torque sensor output value and used for a wheel lock determination.

The word "locked" as used in the specification and claims is used in the broad sense to mean that something blocks or obstructs turning of the wheels.

What is claimed is:

1. A method of determining whether or not a wheel is locked, for use in an electric power steering control apparatus, wherein: it is determined whether an output value of a steering torque sensor for detecting steering torque is either equal to or larger than a predetermined threshold value; when the output value is either equal to or larger than the predetermined threshold value, it is determined whether the output value has continued to be either equal to or larger than the predetermined threshold value for more than a predetermined length of time; and when it is determined that the output value of the steering torque sensor has continued to be either equal to or larger than the predetermined threshold value for more than the predetermined length of time, then it is determined that a wheel is locked.

2. A method for determining whether or not a wheel is locked as claimed in claim 1, wherein the determination as to whether the wheel is locked or not is made only when a motor of the steering control apparatus is in an energized state.

3. A method for determining whether or not a wheel is locked as claimed in claim 1, wherein the determination as to whether the wheel is locked or not is made only when a motor of the steering control apparatus is in an energized state, and wherein the predetermined threshold value is varied according to the electric current value of the motor.

4. A method for determining whether or not a wheel is locked as claimed in claim 3, wherein when electric current value of the motor is larger than a predetermined value, the predetermined threshold value is increased.

5. A method for determining, in a series of cycles of processing, whether or not a wheel is locked, for use in an electric power steering control apparatus, wherein: when a motor of the steering control apparatus is in an energized state, it is determined whether a torque sensor output value detected in a current cycle of processing is larger than a torque sensor output value detected in a prior cycle of processing, and whether the torque sensor output value detected in the current cycle of processing has continued to be larger for more than a predetermined length of time; and when it is determined that the torque sensor output value detected in the current cycle of processing has continued to be larger than the torque sensor output value detected in the prior cycle of processing for more than the predetermined length of time, then it is determined that a wheel is locked.

6. A method for determining whether or not a wheel is locked as claimed in claim 5, wherein the determination as to whether the wheel is locked or not is made only when electric current value of the motor is larger than a predetermined value.

7. A method for determining whether or not a wheel is locked as claimed in claim 5, wherein the determination as to whether the wheel is locked or not is made only when electric current value of the motor is larger than a predetermined value and, when it is determined that the wheel is locked, the motor is de-energized.

8. A method for determining whether or not a wheel is locked as claimed in claim 5, wherein the determination as to whether the wheel is locked or not is made only when electric current value of the motor is larger than a predetermined value and, when it is determined that the wheel is locked, the electric current to the motor is progressively reduced.

9. A method for determining whether or not a wheel is locked as claimed in claim 5, wherein the determination as to whether the wheel is locked or not is made only when electric current value of the motor is larger than a predetermined value and, when it is determined that the wheel is locked, energization of the motor is inhibited, while when it is not determined that the wheel is locked, energization of the motor is permitted.

10. A method for determining whether or not a wheel is locked as claimed in claim 5, wherein the determination as to whether the wheel is locked or not is made only when electric current value of the motor is larger than a predetermined value and, when it is determined that the wheel is locked, the electric current to the motor is progressively reduced, while when it is not determined that the wheel is locked, the electric current to the motor is progressively increased.

11. A method for determining, in a series of cycles of processing, whether or not a wheel is locked, for use in an electric power steering control apparatus, wherein: when a motor of the power steering control is in an energized state, it is determined whether a torque sensor output value detected in a current cycle of processing is larger than a torque sensor output value detected in the prior cycle of processing, whether the difference between the two values is greater than a predetermined difference threshold, and whether the torque sensor output value detected in the current cycle of processing has continued to be larger for more than a predetermined length of time; and when it is determined that the torque sensor output value detected in the current cycle of processing has continued to be larger than the torque sensor output value detected in the prior cycle of processing for more than the predetermined length of time, with the difference between the two values being greater than the predetermined difference threshold, then it is determined that a wheel is locked.

12. A method for determining whether or not a wheel is locked, as claimed in claim 11, wherein the difference threshold value is varied according to electric current value of the motor.

13. A method for determining whether or not a wheel is locked as claimed in claim 11, wherein when electric current value of the motor is larger than a predetermined value, the difference threshold value is increased.

* * * * *